(No Model.)  J. W. LATTA.  3 Sheets—Sheet 1.
CAR COUPLING.
No. 475,326.   Patented May 24, 1892.
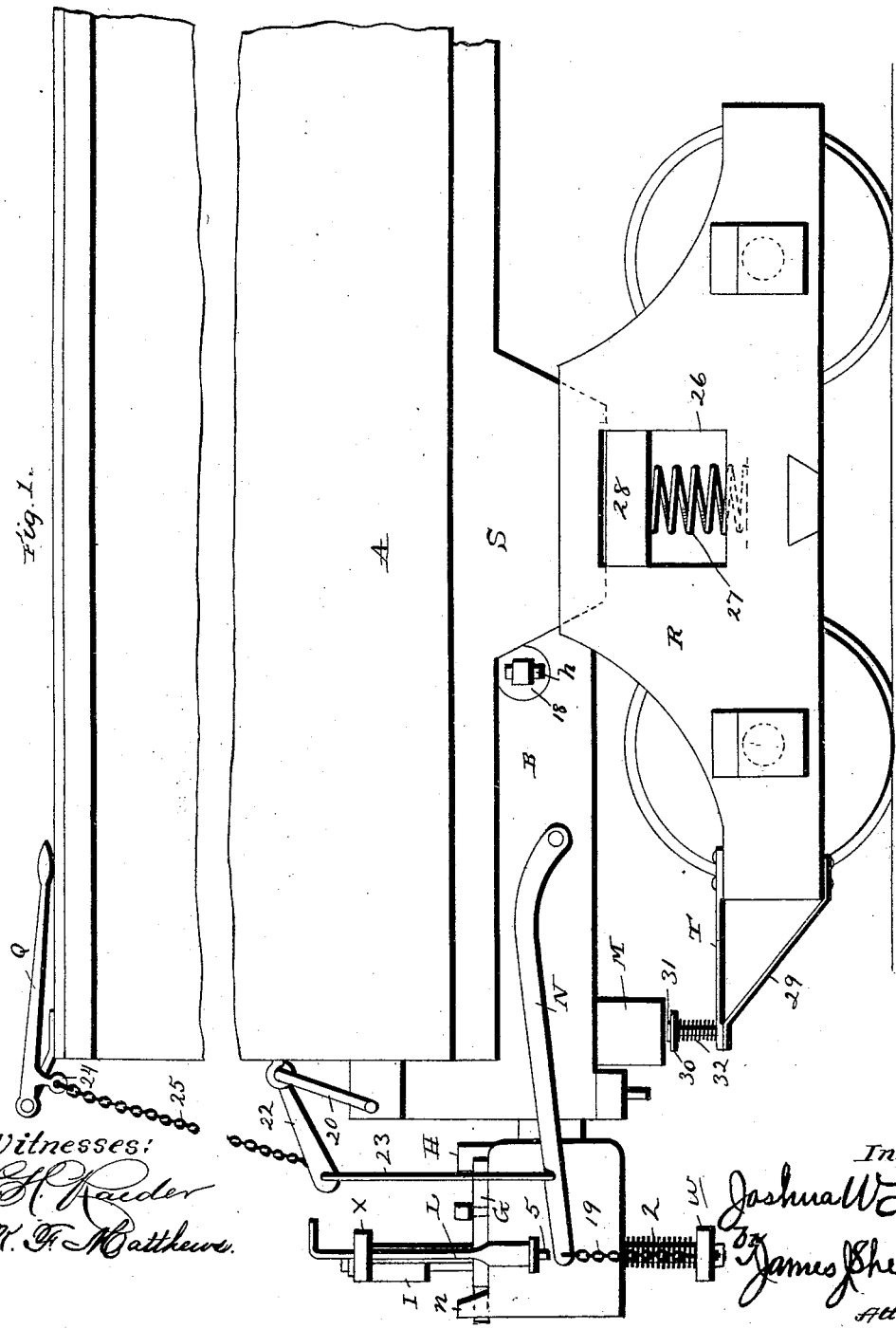

(No Model.) 3 Sheets—Sheet 2.
J. W. LATTA.
CAR COUPLING.
No. 475,326. Patented May 24, 1892.
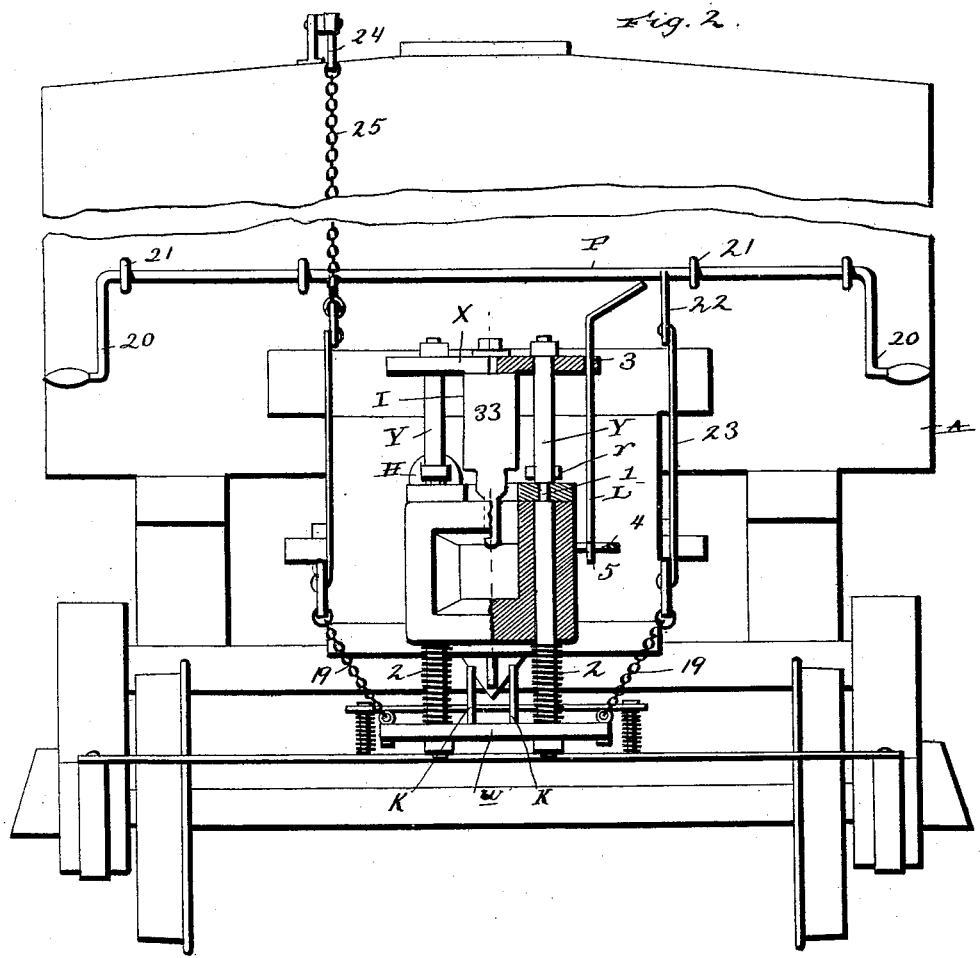
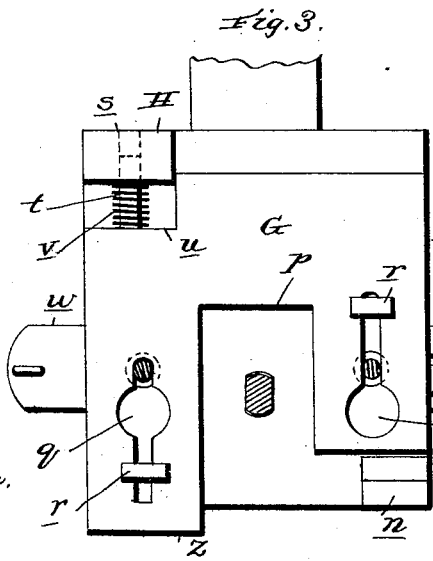
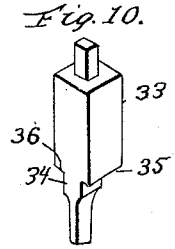
Witnesses:
C. H. Raeder
H. F. Matthews
Inventor
Joshua W. Latta
by James Sheehy
Attorney (No Model.) 3 Sheets—Sheet 3.
J. W. LATTA.
CAR COUPLING.
No. 475,326. Patented May 24, 1892.
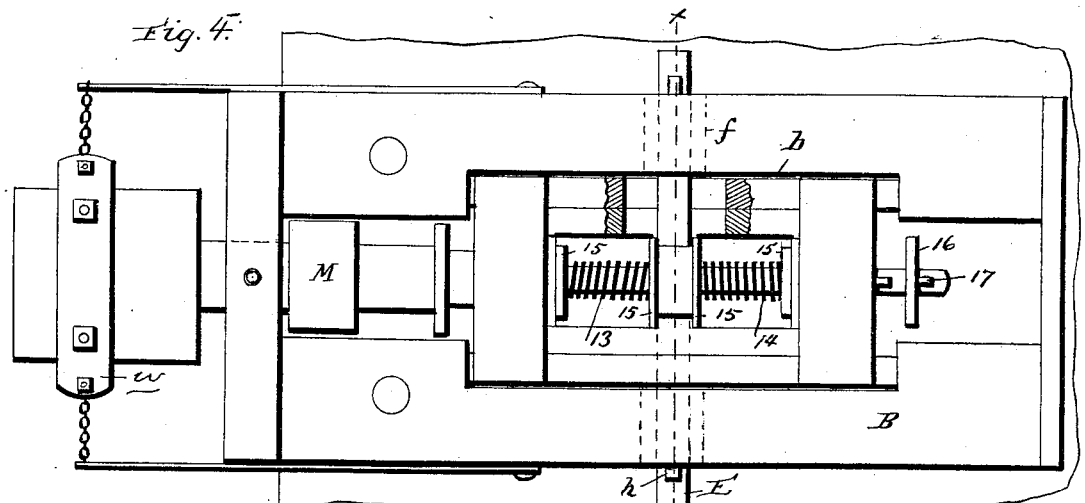
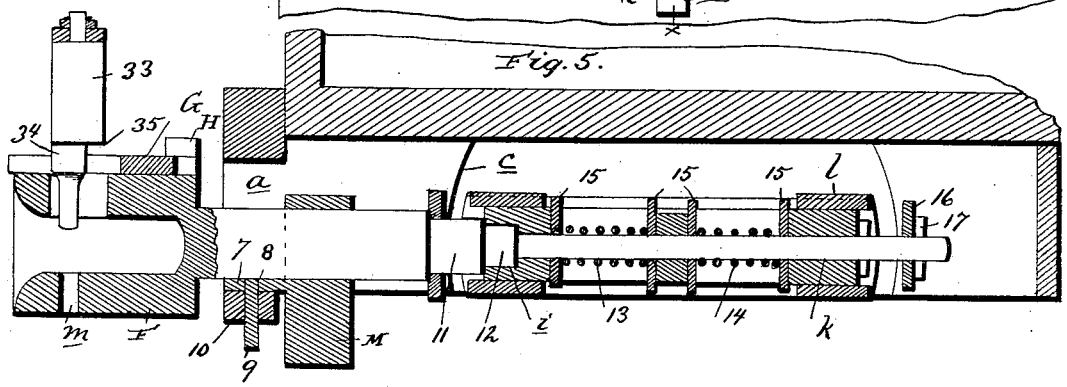
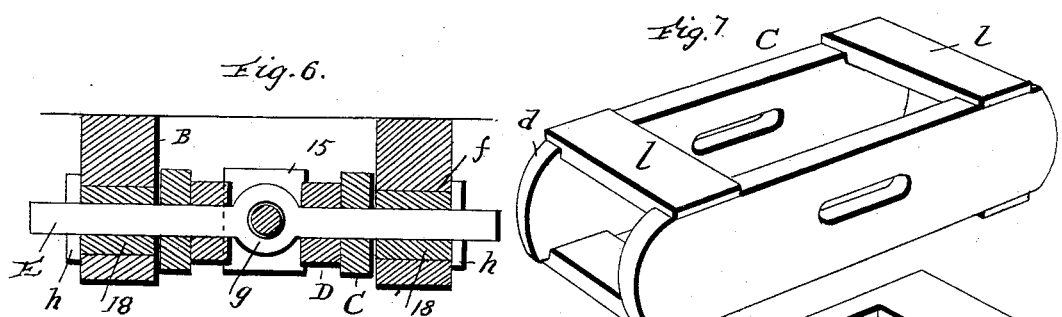
Witnesses:
C. H. Raeder
W. F. Matthews
Inventor
Joshua W. Latta
by James Sheehy
Attorney

UNITED STATES PATENT OFFICE.

JOSHUA W. LATTA, OF SHERMAN, WYOMING.

CAR-COUPLING.

SPECIFICATION forming part of Letters Patent No. 475,326, dated May 24, 1892.

Application filed June 25, 1891. Serial No. 397,559. (No model.)

*To all whom it may concern:*

Be it known that I, JOSHUA W. LATTA, a citizen of the United States, residing at Sherman, in the county of Albany and State of Wyoming, have invented certain new and useful Improvements in Car-Couplers; and I do declare the following to be a full, clear, and exact description of the invention, such as will enable others skilled in the art to which it appertains to make and use the same.

This invention has relation to an improvement in car-couplings and devices connected with the truck of a car for elevating the draw-head when the car-body has been depressed by the weight of its load; and, among other things, the invention has for its object to provide a coupler which will be automatic, and thereby obviate the objectionable and dangerous necessity of going between the cars to couple and uncouple them.

A further object of the invention is to provide devices whereby the coupling-pin may be raised by an attendant from the top or either side of a car and automatically locked in such raised position, attachments being provided for tripping the pin when two cars have been brought together for coupling and springs arranged so as to insure the positive dropping or seating of the pin in the draw-head when a coupling is to be effected.

Other objects and advantages will appear from the following description and claims when taken in connection with the annexed drawings, in which—

Figure 1 is a side view of a part of a car equipped with my improvements. Fig. 2 is a front view of the same with the draw-head and coupling-pin partly in section and partly broken away. Fig. 3 is a plan view of the draw-head, partly broken away, with the guide-rods for the coupling-pin and also the latch therefor in section. Fig. 4 is an inverted plan view of the draw-head and attachments with the car partly broken away and parts in section. Fig. 5 is a longitudinal vertical sectional view of Fig. 4. Fig. 6 is a cross-sectional view taken in the plane indicated by the dotted line $x\,x$ on Fig. 4. Fig. 7 is a perspective view of the oscillating frame secured to the stem of the draw-head. Fig. 8 is a perspective view of the rectangular frame arranged within the oscillating frame and receiving the stem of the draw-head, and Fig. 9 is a perspective view of the lug secured to the stem of the draw-head and adapted to serve with the attachments carried by the truck-frame to raise said draw-head when the car-body has been depressed by the weight of the load; and Fig. 10 is a perspective view of the coupling-pin.

Referring by letters and figures to said drawings, A indicates a car-body, which may be of any ordinary or approved construction.

Secured centrally to the under sides of this body and at opposite ends is a longitudinal frame B, having an aperture $a$ at one end for the passage of the stem of the draw-head, and its vertical side walls are cut out or recessed at opposite points, as shown at $b$, and the opposite end wall of each recess is curved vertically, as shown at $c$, for the purpose which will be presently explained.

C indicates a frame, which I shall denominate a "sliding oscillating frame." This frame C is placed within the recessed walls of the frame B, and has the opposite ends of its walls terminating in rockers $d$, so that they may bear against the recessed or curvilinear walls $c$ of the frame B and rock therein.

D indicates a rectangular frame. This frame is designed to be placed in the frame C, and the side walls of both frames have aligned elongated slots $e$, which are designed to coincide with the holes or apertures $f$ in the recessed side walls of the frame B and receive a rod E. This rod E, which passes through the slots in the frames C and D and also the holes or apertures $f$ in the side walls of the frame B, so as to pivot said frames C and D therein and allow them to move longitudinally, is also provided with a central horizontal eye $g$ for the passage of the draw rod or stem of the draw-head, and this rod E may be secured in position by keys or pins $h$, as shown, or other suitable fastening devices. The frame D is provided in its forward end with a rectangular aperture $i$ and at its rear end with a round hole or aperture $k$ to receive correspondingly-shaped parts of the draw rod or stem of the draw-head. The frame B, after being placed within the frame C, is prevented from vertical movement therein by means of the cross-strips $l$.

F indicates the draw-head. This draw-head is provided with the pin-receiving aperture *m*, and on its upper side of one of its forward corners is a lug *n*, which is designed to serve as a stop for the forward movement of a tripping-slide G. The slide G, which is arranged upon the upper side of the draw-head, is cut out, as shown at *p*, for a purpose which will be presently explained. Said slide is also provided at opposite sides of this cut-out portion with keyhole-slots *q*, which are arranged reversely to each other, and each carry a stop-pin *r* for limiting the sliding movement of said plate upon the draw-head. H is a lug formed on the upper side at one of the inner corners of the draw-head, and is provided with an eye *s* to receive a rod *t*, secured to the plate G at the cut-out corner *u*, and a spiral spring *v* is interposed upon the rod between the plate and the lug. Sliding transversely in the draw-head is a yoke comprising a cross-strip *w* beneath the draw-head, an upper cross strip or head X above the draw-head, and two vertically-disposed rods Y, passing through holes in the draw-head on opposite sides of the pin-aperture. These rods Y are reduced in diameter, as shown at 1, and have spiral or coiled springs 2 encircling them and interposed between the lower cross strip or edge *w* and the under side of the draw-head for the purpose of drawing down the yoke and the coupling-pin I, carried by the upper cross head or strip X when the slide has been moved, so as to disengage from the reduced or shouldered portions 1 of the rods. Vertical stop-pins K are fixed on the lower cross head or strip W, as shown, so as to limit the upward movement of the yoke, and consequently the coupling-pin in the draw-head. It will be observed that when the yoke, and consequently the coupling-pin carried thereby, has been raised by devices which will be presently described until said pin reaches a certain altitude the spring *v* will act upon the slide-plate G, so as to thrust the same forwardly against the stop *n*. This movement will cause the narrow slots of the keyhole-slots *q* to pass into the reduced portions 1 of the rods Y, and consequently hold the yoke and pin elevated until a car to be coupled strikes the projected ends Z of the slide-plate, so as to force it back upon the draw-head and release the rods of the yoke, which, being under tension by the action of the springs 2, will draw down said yoke and the coupling-pin, so as to automatically effect the coupling of the cars.

As it is sometimes desirable to have the cars bump or contact without effecting the coupling and to hold the pin raised, I have provided a latch L, which may comprise a rod or a strip of suitable material, passing through an eye or guide 3 in the upper head of the yoke and its opposite end passing through a guide 4 on one side of the draw-head. This latch has its lower end reduced, as shown at 5, so that by turning it in one direction it may straddle the lower guide-eye 4 and bear thereon, while by turning it in the opposite direction it may pass through said eye. The rod should have a limited movement in the eye 3, so that when it is desired to lock the pin and yoke in an elevated position it is simply necessary to manipulate this latch.

The stem or shank of the draw-head which passes through the vertically-elongated opening *a* in the forward end of the frame B is preferably of rectangular form in cross-section and sufficiently reduced to allow said stem to play vertically through said opening, and has secured to it just within the opening *a* a lug M. This lug is preferably of a form substantially as shown in Fig. 9 of the drawings, having an angular opening 6 to receive the rectangular portion of the stem of the draw-head and a forward branch 7, leading from said opening and bearing a hole 8 to receive a pin 9, whereby said branch and its lug may be secured so as to limit its longitudinal movement within the frame B, the pin 9 taking through a hole 10 in the lower wall of the aperture *a* of said frame, whereby said lug M may be allowed to move vertically with the draw-head, but is prevented from moving longitudinally thereon, and it is obvious that this pin 9 may be formed integral with the branch of the lug. The stem of the draw-head is shouldered, as shown at 11, and the plate having the aperture corresponding with the outline of said shoulder portion is placed thereon and against the forward end of the oscillating frame C, and said stem is further shouldered at 12 in a reduced manner and takes into an aperture *i* in the forward end of the frame D. Spiral springs 13 and 14 interpose the draw-head or stem of the head between the eye G of the transverse pivot-rod E and the opposite end walls of the frame D, plates 15 being arranged at the opposite end of the respective springs, so that they may bear against the same, and the rod is prevented from drawing out of the oscillating frame, and also the frame D, by means of a plate 16 and pin 17 or other suitable holding devices. The opposite ends of the transverse pivot-rod E bear in circular blocks 18, so as to ease the rocking movements of said rod.

N indicates lateral levers. These levers, which are preferably curved, as shown, are pivoted at their inner ends to the outer sides of the frame B, and their opposite ends are connected by means of chains 19 or other suitable devices with the opposite ends of the lower cross bar or head *w* of the yoke.

P indicates a rock-shaft. This rock-shaft, which has its opposite ends terminating in crank-handles 20, is journaled in bearings 21 on the front and rear walls of the car-body and at a convenient point for an attendant to operate it while standing upon the ground. This rock-shaft is provided with fixed arms 22, which are connected pivotally by means of links or rods 23 to the levers M and near their forward ends. It will thus be seen that by manipulating the rock-shaft E through the medium of the levers M and the links 23 and chains 19 the coupling-pin may be raised and set for a coupling without going between the cars.

In order that the coupling may be operated from the top of a box-car, I pivot at the end of the roof a hand-lever Q, which has its bearing in a suitable bracket, and connect a short branch 24 of said lever with one of the fixed arms 22 by means of a rope or chain 25, as by the employment of these devices an attendant can raise and set the pin without leaving the top of the car.

I shall now proceed to describe the means which I provide for operation between the truck and draw-head, so as to raise said head and keep it at its normal altitude, although the car-body may be depressed by the weight of the load.

Referring more particularly to these devices, R indicates the truck, and S indicates the hangers of the car-body. The truck or frame is provided with the usual aperture 26 and coiled springs 27 and the hangers carrying the usual cross-bars 28, which pass into said apertures and bear upon the springs therein.

Secured to the forward ends of the truck-frame is a metallic frame T, preferably composed of a bar of steel arranged transversely in advance of said truck-frame, with its ends secured to the frame, as shown, and firmly braced in a horizontal position by means of a brace-arm 29. Mounted upon this metallic frame T and at a point just below the lug M, secured to the frame B, is a plate 30, supported upon vertical rods 31, rising from the frame P and bearing upon springs 32, which encircle said rods, the rods being headed, so as to limit the upward play of said plate 30. By this construction it will be seen that when a car has been heavily loaded, so as to depress its body below its normal position, the draw-head may be kept elevated and held in a position to couple with a car of greater altitude, and by reason of the springs backing the plate 30 it will be seen that the draw-head will be sustained yieldingly, so that no damage will be done to the parts, and the head thereby more readily adapt itself to the coupling.

From the foregoing description, taken in connection with the accompanying drawings, the operation and advantages of my invention will be obvious.

By special reference to Fig. 10 of the drawings it will be seen that the coupling-pin is of a peculiar construction, having an enlarged portion 33, which is preferably of a rectangular form in cross-section to enter a corresponding passage in the upper jaw or wall of the draw-head. This pin has a reduced depending portion 34, which extends from the forward under side to enter a hole in the lower side or wall of the draw-head, and the enlarged portion 33 extends rearwardly from the reduced portion 34, as shown at 35, and also extends laterally, as shown at 36. The object of these extensions is to sustain the coupling-link in a horizontal position or the free end slightly elevated, so as to avoid the necessity of a person going between the cars to handle the link in coupling. When the coupling-pin has been drawn down, as before described, these projections or shoulders will assume a position with respect to the inner lower wall of the draw-head, so as to permit but little play of the coupling-link horizontally.

Having described my invention, what I claim is—

1. In a car-coupling, the combination, with the draw-head having the pin-aperture and the vertical apertures on opposite sides thereof, of the yoke carrying the coupling-pin and having the rods movable in the apertures of the draw-head surrounded by springs beneath the draw-head and also shouldered, and the spring-backed slotted slide on the upper side of the draw-head adapted to engage the shoulders in the rods of the yoke, so as to hold the pin elevated, substantially as specified.

2. The combination, with the draw-head having the pin-aperture and the vertical apertures on opposite sides thereof and also having the guide-lug eye and the stop on its upper side, of the slide having the keyhole-slots and the rod surrounded by a spring adapted to enter the lug-eye, the spring for advancing the forward edge of the slide beyond the draw-head, and the spring-pressed yoke carrying the coupling-pin and adapted to be engaged by the slide, so as to hold the same elevated, substantially as specified.

3. In a car-coupling, the combination, with the frame secured to the under side of a car and having its opposite side walls recessed and its forward end provided with an aperture to receive the stem of the draw-head, of a draw-head passing into said frame, the lug secured to the stem of the draw-head, and means carried by a truck for contacting with the lug to raise the draw-head in the frame, substantially as specified.

4. In a car-coupling, the combination, with the frame adapted to be secured to the under side of a car and having its opposite side walls recessed, of the oscillating frame arranged within the recesses and having its side walls slotted, the frame arranged within the oscillating frame and having corresponding slots, the transverse pivot bolt or rod having a horizontally-disposed eye and passing through the side walls of the respective frames, and the draw-head having its stem passing through the oscillating frame and frame therein and also through the eye in the pivot-bolt, substantially as specified.

5. In a car-coupling, the combination, with the frame B, of the frame C, arranged in the recessed walls thereof and having the elongated slots in the sides, the frame D, arranged within the frame C and having corresponding slots in its sides, the pivot-bolt passing through said slotted sides and sides of the frame B and having an eye g, and the draw-head having its stem passing through the eye of the pivot-bolt and yieldingly secured in the frame D, substantially as specified.

6. In a car-coupling, the combination, with the frame B, having its side walls recessed, of the frame C, having its side walls slotted and arranged in the recessed walls of said frame B, the frame D, having its sides correspondingly slotted and arranged within the frame C, the draw-head having its stem passing through the frame D, the transverse rod E, passing through the respective frames and also receiving the stem of the draw-head, the springs surrounding said stem within the frame D and on opposite sides of the eye of the pivot-rod E, and plates backing said springs, substantially as specified.

7. A draw-head having its stem secured in a rocking or oscillating frame, in combination with a lug secured to the stem in advance of said frame, whereby the draw-head may be raised by devices contacting with said lug, substantially as specified.

8. In a car-coupling, the combination, with a frame secured to the under side of a car and adapted to receive the stem of the draw-head, of the draw-head, the yoke adapted to move vertically in said head and carrying the coupling-pin, the levers pivoted to the frame at one end and connected by means of chains at their opposite ends to the lower part of the yoke, the operating-shaft journaled in the car-body, and rods or links connecting said levers at an intermediate point of their length with fixed arms on the operating-shaft, substantially as specified.

9. The combination, with a draw-head, of a yoke passing vertically through the same and having springs interposed between the lower part of the frame and the under side of the draw-head and also carrying the coupling-pin, the levers pivoted at one end to a frame secured to the car and connected at their opposite end by means of chains with the lower part of the yoke, the operating-shaft journaled in the car-body, links connecting said shaft with said levers, and a lever pivoted to the top of the car and connecting with the operating-shaft by means of a chain, substantially as specified.

10. The combination, with a car-truck, of a transverse frame secured to the forward end of the truck-frame, a draw-head secured in a frame and adapted to move vertically therein, and the lug secured to the stem of the draw-head to be engaged by the frame carried by the truck, so as to elevate said draw-head when the car-body has been depressed, substantially as specified.

11. The combination, with a car and a truck thereof, of a transverse frame secured to the forward end of the truck-frame, a draw-head secured to the car-frame and adapted to move vertically, and the lug on the stem of the draw-head carrying the pin passing through a hole in the frame through which said stem passes, substantially as specified.

12. The combination, with the truck, of the transverse frame secured to the forward end thereof, the plate or strip arranged on the frame, the springs sustaining said plate or strip vertically, and the draw-head adapted to be moved vertically and the lug receiving the draw-head to be moved vertically therewith and adapted to be engaged by the yieldingly-sustained plate of the frame carried by the truck, substantially as specified.

13. The improved coupling-pin having the enlarged portion 33, the reduced depending portion 34, the rear projection or shoulder 35, and the lateral projections or shoulders 36, the whole formed entire and adapted to operate in a draw-head, substantially as specified.

In testimony whereof I affix my signature in presence of two witnesses.

JOSHUA W. LATTA.

Witnesses:
  W. J. HILLS,
  C. W. BUSSARD.